Sept. 7, 1943.    R. A. YOHPE    2,328,702
HOMOGENIZER VALVE STRUCTURE
Filed June 30, 1941
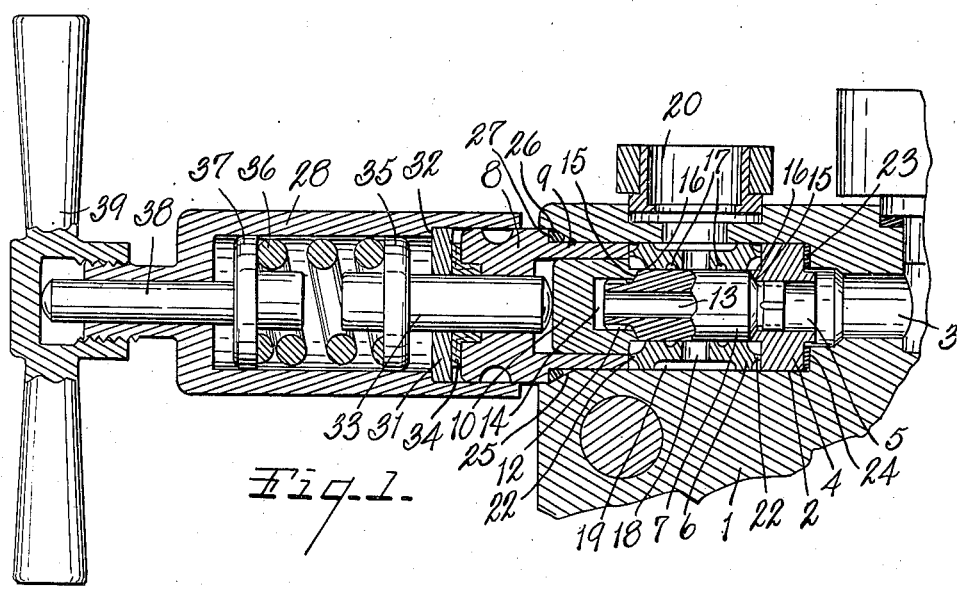
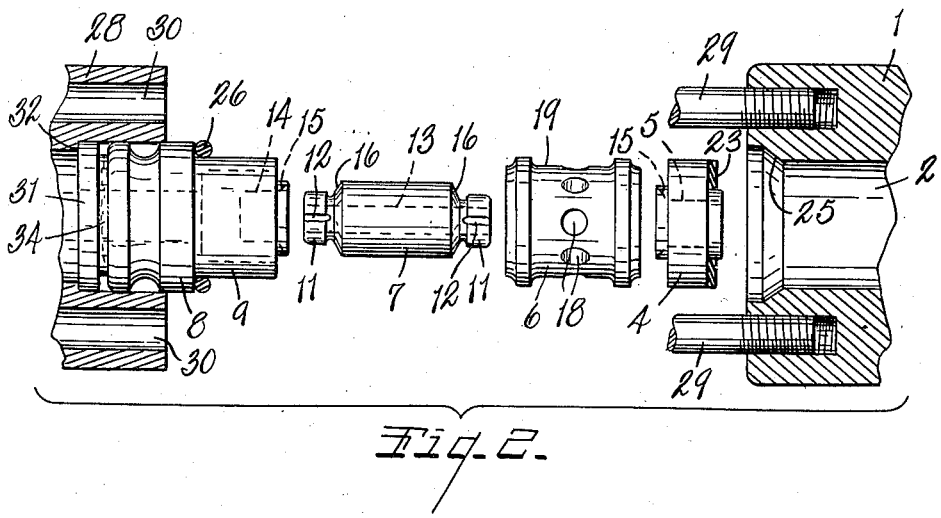
INVENTOR.
Reinhard A. Yohpe
BY
Earl + Chappell
ATTORNEYS.

Patented Sept. 7, 1943

2,328,702

UNITED STATES PATENT OFFICE 2,328,702

HOMOGENIZER VALVE STRUCTURE

Reinhard A. Yohpe, Battle Creek, Mich., assignor to Union Steam Pump Company, Battle Creek, Mich.

Application June 30, 1941, Serial No. 400,407

11 Claims. (Cl. 99—265)

This invention relates to improvements in homogenizer valve structures.

The main objects of this invention are:

First, to provide an improved valve structure for homogenizing, emulsifying and like apparatus characterized by its effectiveness in reducing the particles of fatty emulsions such as milk, cream and the like.

Second, to provide a homogenizing or emulsifying structure of the foregoing type which is characterized by its compactness and the smallness in size of its parts.

Third, to provide a homogenizer valve structure in which the valve is balanced so as to be free from vibration due to pressure surges in the liquid passing the same.

Fourth, to provide a homogenizing or equivalent valve of improved, self-compensating construction involving the flow of liquid in two opposed directions whereby to assist in the homogenization or emulsification thereof.

Further objects relating to details and economies of my invention will appear from the description to follow. The invention is defined in the claims.

A structure embodying the features of my invention is illustrated in the accompanying drawing, wherein:

Fig. 1 is a fragmentary view partially broken away and in longitudinal vertical section illustrating the homogenizing or emulsifying machine in accordance with my invention.

Fig. 2 is an exploded view in plan illustrating the parts of the valve structure and showing the relationship thereof prior to assembly.

Referring to the drawing, the reference numeral 1 designates the valve and pumping cylinder block of a homogenizing machine adapted to homogenize or emulsify fatty liquids by breaking up the fatty particles thereof. Machines of this general type are well known to the art. The block 1 is bored out to provide a valve cylinder or chamber 2 which is in communication through the counterbored passage 3 with a plurality of pump cylinders and from which the liquid to be homogenized, for example, milk or cream, is supplied to the valve cylinder under heavy pressure.

The cylinder 2 telescopingly receives various parts of the valve structure of my invention, viz.: a cylindrical valve seat member 4, the hollow interior 5 of which is coaxial and in communication with passage 3; a generally cylindrical breaker ring 6, and generally cylindrical hollow valve member 7 disposed coaxial with and interiorly of the breaker ring and cylindrical end stuffing box and thrust member 8 having an integral sleeve extension 9 extending into cylinder 2; and a second valve seat member 10 which is telescoped within the sleeve extension 9.

The opposed valve seat members 4, 10 serve as centering guides for the opposite similar ends 11 of valve 7, these ends being peripherally grooved at 12 to permit the flow of liquid therepast. As stated, the hollow interior or bore 13 of valve 7 is coaxial with and communicates with passage 3, likewise with the bore 5 of seat member 4 and with a bore 14 in the seat member 10, which, unlike the bore 5, does not extend completely through the seat member in which it is formed.

Each of the seat members 4, 10 is provided with an annular conical valve seat 15 coacting with an annular conical sealing surface 16, one of which is located at either opposite end of valve 7.

The breaker ring 6 surrounds valve 7 with slight peripheral or circumferential clearance, it being understood that the liquid travels in either direction axially externally of the valve between the same and the breaker ring after passing radially outwardly between the coacting conical surfaces of the valve 7 and valve seat members 4, 10, respectively. To accentuate the homogenizing action, the breaker ring is provided on its internal periphery with annular grooves 17 on either side of a set of radial passages 18 formed therethrough, which passages communicate directly with an annular space 19 surrounding the breaker ring with the discharge fitting 20 of the valve. The annular discharge space 19 is constituted by a suitable relatively wide annular groove surrounding the breaker ring. At its right hand end, as viewed in Fig. 1, the breaker ring 6 is provided with an annular projection or annularly spaced projections 22 which are in end thrust engagement with the valve seat member 4, this latter member being in end thrust engagement with a relatively hard fibrous backing 23 which is interposed between the member and an annular shoulder 24 at one end of valve cylinder 2.

At its opposite end, the breaker ring has a similar annular projection or projections 22 which are engaged by the annular sleeve extension 9 of the combined stuffing box and thrust member 8. Externally of this sleeve, cylinder 2 is beveled or chamfered outwardly at 25 to receive a relatively soft annular packing ring 26, the latter being urged axially against the bevel 25 by an external annular shoulder 27 formed on member 8. The function of the relatively hard and soft packings 23, 26 will be hereinafter referred to in greater detail, and it need only be stated that the pressure for maintaining axial thrust on these packings as well as on the breaker ring 6 to maintain the latter in place is furnished by an elongated pressure head 28 which is disposed axially of cylinder 2 and maintained in fixed relation relative to the cylinder block 1 by means of threaded tie-rods or bolts 29, which extend through spaced apertures 30 in the said head and likewise into the valve block, one at either side of cylinder 2. Pressure is transmitted to the combined stuffing box and thrust member 8 through the engagement of a thrust ring 31 coaxial with member 8 with an internal shoulder 32 on the thrust head 28. The ring 31 and thrust member 8 are apertured to slidably receive a central adjusting plunger 33, and the ring transmits axial force from head 28 to the thrust member 8, hence to breaker ring 6, through a sealing gasket 34 which surrounds and seals the surface of plunger 33. In this manner by taking up the bolts or tie-rods 29, the force exerted by the sleeve extension 9 of the thrust member 8 on the breaker ring 6 and end valve seat member 4 and hard packing 23 may be adjusted as desired.

The plunger 33 is employed for the purpose of adjusting axial clearance between the valve surfaces 16 and valve seats 15. To this end it abuts at its right hand end, as viewed in Fig. 1, the seat member 10 and at its left hand end is provided with an enlargement or shoulder 35 against which a coil compression spring 36 engages. Spring 36 at its opposite end engages an adjustable abutment 37 on a stem 38 guided in the extremity of pressure head 28 and engaged by a handled adjusting screw 39 which is threaded on the said extremity of the pressure head.

In operation, the milk or other fatty liquid to be emulsified or homogenized is supplied under pressure through passage 3 from a bank of pumps normally located immediately to the right of the valve and pumping block 1 as illustrated in Fig. 1. Entering the bore 5 of the valve seat member 4, part of the liquid is forced radially outwardly of valve 7 through the flutes 12 in the periphery of its end, thence past the valve and valve seat surfaces 15, 16, thence axially between the valve and breaker ring 6 to the exit passages 18. Another part of the liquid travels axially through central bore 13 of the valve into the interior of valve seat member 10, thence axially through the flutes 12 at the left hand end of valve 7 radially past the left hand valve and valve seat surfaces 15, 16, thence axially between the coacting annular or peripheral surfaces of the valve breaker ring to the radial discharge passages 18. In flowing oppositely between the valve and breaker ring, the opposing streams of liquid impinge upon each other with considerable force adjacent to passages 18 which helps considerably in augmenting the homogenizing action.

The axial clearance between the valve and valve seat surfaces 15 is adjustable with nicety by manipulation of the handled adjusting member 39 so that the desired degree of homogenization can be had. The provisions for dividing the flow so as to cause the same to pass between two annular restricting valve surfaces has the advantage that it minimizes the area of the parts without minimizing the effectiveness of the homogenizing action correspondingly. Thus it will be understood that were the liquid forced between but two annular surfaces, it would be necessary to increase the diameter thereof at once in order to get the same effective peripheral valve area as I obtain by splitting the area between two pairs of surfaces. For such a double diameter of valve surface it would be necessary to increase the pressure or force on the valve four times in order to maintain an equal homogenizing action, inasmuch as the force required varies with the area which in turn varies with the square of the radial dimension. It will likewise be apparent to those skilled in the art that by dividing the flow of the liquid in the manner described, I am enabled to reduce the clearance between the breaker ring and valve 7 without increasing the liquid pressure required; moreover, that I secure the advantage of impingement of two oppositely traveling annular streams for further augmenting the effectiveness of the homogenizing action.

The structure of my invention is vibrationless due to the fact that the divided distribution of the liquid causes valve 7 to float between the two films of liquid passing the valve and valve seat surfaces 15, 16 at either end thereof. This balance is maintained by the hydraulic energy relationships at the ends of the valve, as if the valve should for any reason tend to be disposed closer to one of the valve seats than to the other, narrowing the space between the seating surfaces at one end and widening this space at the other end, the velocity of the fluid through the narrower space would be reduced, resulting in an increase in pressure between the seating surfaces at this end while the velocity at the other end which has the wider opening between the seating surfaces would be increased, resulting in a decrease in the pressure between these surfaces and the difference in pressures at the two ends of the valves causes the valve to be moved to equalize the pressures at both ends resulting in a substantially equal opening between the seating surfaces at both ends of the valve. The division of the liquid at the respective ends of the valve is substantially equal.

I desire to draw attention to the fact that inasmuch as one of the packings, designated 26, is softer than the other, designated 23, it is enabled to set first against the surfaces coacting therewith, yielding somewhat so as to allow the harder packing to assume an effective sealing engagement with its coacting parts.

The embodiment of the invention which incorporates the principles of the invention in a highly desirable manner have been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. In a homogenizing valve of the type described, a cylindrical valve chamber open at one end thereof for communication with a source of liquid under pressure, an annular valve seat member disposed in and adjacent said end of said cylinder provided with an annular valve seat concentric with the cylinder, an annular breaker ring abutting said seat member disposed concentrically in said cylinder, a double ended hollow cylindrical valve concentrically received by said breaker ring with a small peripheral clearance therebetween, a further annular valve seat member in said cylinder provided with an annular valve seat concentric with said cylinder and valve, said valve having opposed surfaces at either end coacting with said seats to provide homogenizing passages therebetween in communication with the peripheral surface intermediate said valve and breaker ring, liquid supplied under pressure to said valve cylinder dividing adjacent said valve and in part traversing the hollow interior thereof whereby streams of liquid are forced between said coacting valve surfaces and seats at either end of the valve, thence axially in opposite directions externally of the valve between the same and said breaker ring, the latter being provided with radial discharge passages intermediate its ends for the discharge of said liquid, and adjustable spring means for compressing said valve and its seat members axially.

2. In a homogenizing valve of the type described, a cylindrical valve chamber open at one end thereof for communication with a source of liquid under pressure, an annular valve seat member disposed in and adjacent said end of said cylinder provided with an annular valve seat concentric with the cylinder, an annular breaker ring abutting said seat member disposed concentrically in said cylinder, a double ended hollow cylindrical valve concentrically received by said breaker ring with a small peripheral clearance therebetween, a further annular valve seat member in said cylinder provided with an annular valve seat concentric with said cylinder and valve, said valve having opposed surfaces at either end coacting with said seats to provide homogenizing passages therebetween in communication with the peripheral surface intermediate said valve and breaker ring, liquid supplied under pressure to said valve cylinder dividing adjacent said valve and in part traversing the hollow interior thereof whereby streams of liquid are forced between said coacting valve surfaces and seats at either end of the valve, thence axially in opposite directions externally of the valve between the same and said breaker ring, the latter being provided with radial discharge passages intermediate its ends for the discharge of said liquid.

3. In a homogenizing valve of the type described, a cylindrical valve chamber open at one end thereof for communication with a source of liquid under pressure, an annular valve seat member disposed in and adjacent said end of said cylinder provided with an annular valve seat concentric with the cylinder, a double ended hollow cylindrical valve, a further annular valve seat member in said cylinder provided with an annular valve seat concentric with said cylinder and valve, said valve having opposed surfaces at either end coacting with said seats to provide homogenizing passages therebetween in communication with the peripheral surface intermediate said valve, said valve having guide means at its ends fitting slidably in said annular valve seat members to guide said valve to said valve seats, liquid supplied under pressure to said valve cylinder dividing adjacent said valve and in part traversing the hollow interior thereof whereby streams of liquid are forced between said coacting valve surfaces and seats at either end of the valve, means for discharging said liquid after it traverses said surfaces and seats, and adjustable spring means for compressing said valve and its seat members axially.

4. In a homogenizing valve of the type described, a cylindrical valve chamber open at one end thereof for communication with a source of liquid under pressure, an annular valve seat member disposed in and adjacent said end of said cylinder provided with an annular valve seat concentric with the cylinder, a double ended hollow cylindrical valve, a further annular valve seat member in said cylinder provided with an annular valve seat concentric with said cylinder and valve, said valve having opposed surfaces at either end coacting with said seats to provide homogenizing passages therebetween in communication with the peripheral surface intermediate said valve, said valve having guide means at its ends fitting slidably in said annular valve seat members to guide said valve to said valve seats, liquid supplied under pressure to said valve cylinder dividing adjacent said valve and in part traversing the hollow interior thereof whereby streams of liquid are forced between said coacting valve surfaces and seats at either end of the valve, and means for discharging said liquid after it traverses said surfaces and seats.

5. In a valve structure of the type described, a cylindrical valve chamber having concentrically disposed therein an outer generally cylindrical breaker ring, a double ended hollow cylindrical floating valve telescoped in said breaker ring with slight circumferential clearance and valve seat members disposed at either end of and concentric with said valve for coaction therewith, said seat members and valve having coacting valve surfaces adjustable at the ends of the valve, and the seat members being centrally apertured for communication with the interior of the valve and telescopically receiving the ends of the latter, means on said valve for communicating the same adjacent the ends thereof with the space between said surfaces whereby liquid may travel in opposite directions from the ends of said valve past said coacting surfaces at either end, thence axially of the valve between the same and said breaker ring, the latter having centrally arranged discharge passages communicating with the peripheral space between the breaker ring and valve for the outward discharge of liquid.

6. In a homogenizing valve of the type described, a valve chamber open at one end for communication with a source of liquid under pressure, a valve seat surrounding said opening, a double ended hollow cylindrical valve having a valve surface coacting with said seat and another valve surface at its opposite end, a valve seat member having a seat to cooperate with said second-named surface on said valve and having an opening therein, and guide means on said valve slidably fitting in said openings to guide said valves to said valve seats, and adjustable spring means for urging said valve seat member against said valve and for urging said valve against said first mentioned valve seat.

7. In a homogenizing valve of the type described, a valve chamber open at one end for communication with a source of liquid under pressure, a valve seat surrounding said opening, a double ended hollow cylindrical valve having a valve surface coacting with said seat and another valve surface at its opposite end, a valve seat member having a seat to cooperate with said second-named surface on said valve and having an opening therein, and guide means on said valve slidably fitting in said openings to guide said valves to said valve seats, and means for urging said valve seat member against said valve and for urging said valve against said first mentioned valve seat.

8. In a homogenizing valve of the type described, a valve chamber open at one end and closed at the other end and having an axial inlet opening into said closed end, an annular valve seat member disposed in and adjacent the closed end of said chamber and surrounding said inlet, a hard packing disposed between said valve seat member and the end of the chamber, a valve seat on said valve seat member, a double end hollow valve axially disposed in said chamber and having an axial passage therethrough, a valve seat member at the other end of said valve and having a valve seat thereon, said valve having valve surfaces thereon the opposite ends cooperating with said valve seats, adjustable pressure means for urging said second valve seat member into said chamber to axially compress said valve and valve seat members, an annular breaker ring surrounding said valve and abutting said first valve seat member, a gland abutting said breaker ring, soft packing means between said gland and said valve chamber, and means for urging said gland into said chamber against said second mentioned packing and to force said breaker ring against said first valve seat member to urge it against said hard packing, said soft packing being engageable first by said gland and compressible thereby before compression of said hard packing.

9. In a homogenizing valve of the type described, a valve chamber open at one end and closed at the other end and having an axial inlet opening into said closed end, an annular valve seat member disposed in and adjacent the closed end of said chamber and surrounding said inlet, a packing disposed between said valve seat member and the end of the chamber, a valve seat on said valve seat member, a double end hollow valve axially disposed in said chamber and having an axial passage therethrough, a valve seat member at the other end of said valve and having a valve seat thereon, said valve having valve surfaces thereon the opposite ends cooperating with said valve seats, adjustable pressure means for urging said second valve seat member into said chamber to axially compress said valve and valve seat members, an annular breaker ring surrounding said valve and abutting said first valve seat member, a gland abutting said breaker ring, packing means between said gland and said valve chamber, and means for urging said gland into said chamber against said second mentioned packing and to force said breaker ring against said first valve seat member to urge it against said first mentioned packing, the one of said packings first engageable being softer than the other, whereby sealing of said valve chamber is assured.

10. In a homogenizing valve of the type described, a valve chamber open at one end and closed at the other end and having an axial inlet opening into said closed end, an annular valve seat member disposed in and adjacent the closed end of said chamber and surrounding said inlet, a hard packing disposed between said valve seat member and the end of the chamber, a valve seat on said valve seat member, a double end hollow valve axially disposed in said chamber and having an axial passage therethrough, a valve seat member at the other end of said valve and having a valve seat thereon, said valve having valve surfaces thereon the opposite ends cooperating with said valve seats, adjustable pressure means for urging said second valve seat member into said chamber to axially compress said valve and valve seat members, an annular sleeve member surrounding said valve and abutting said first valve seat member, a gland abutting said sleeve member, soft packing means between said gland and said valve chamber, and means for urging said gland into said chamber against said second mentioned packing and to force said sleeve member against said first valve seat member to urge it against said hard packing, said soft packing being engageable first by said gland and compressible thereby before compression of said hard packing.

11. In a homogenizing valve of the type described, a valve chamber open at one end and closed at the other end and having an axial inlet opening into said closed end, an annular valve seat member disposed in and adjacent the closed end of said chamber and surrounding said inlet, a packing disposed between said valve seat member and the end of the chamber, a valve seat on said valve seat member, a double end hollow valve axially disposed in said chamber and having an axial passage therethrough, a valve seat member at the other end of said valve and having a valve seat thereon, said valve having valve surfaces thereon the opposite ends cooperating with said valve seats, adjustable pressure means for urging said second valve seat member into said chamber to axially compress said valve and valve seat members, and annular sleeve member surrounding said valve and abutting said first valve seat member, a gland abutting said sleeve member, packing means between said gland and said valve chamber and means for urging said gland into said chamber against said second mentioned packing and to force said sleeve member against said first valve seat member to urge it against said first mentioned packing, the one of said packings first engageable being softer than the other, whereby sealing of said valve chamber is assured.

REINHARD A. YOHPE.